Oct. 4, 1949.  M. T. GANNON  2,483,391
DEVELOPING MAGAZINE FOR CAMERAS
Filed Jan. 10, 1948  2 Sheets-Sheet 1
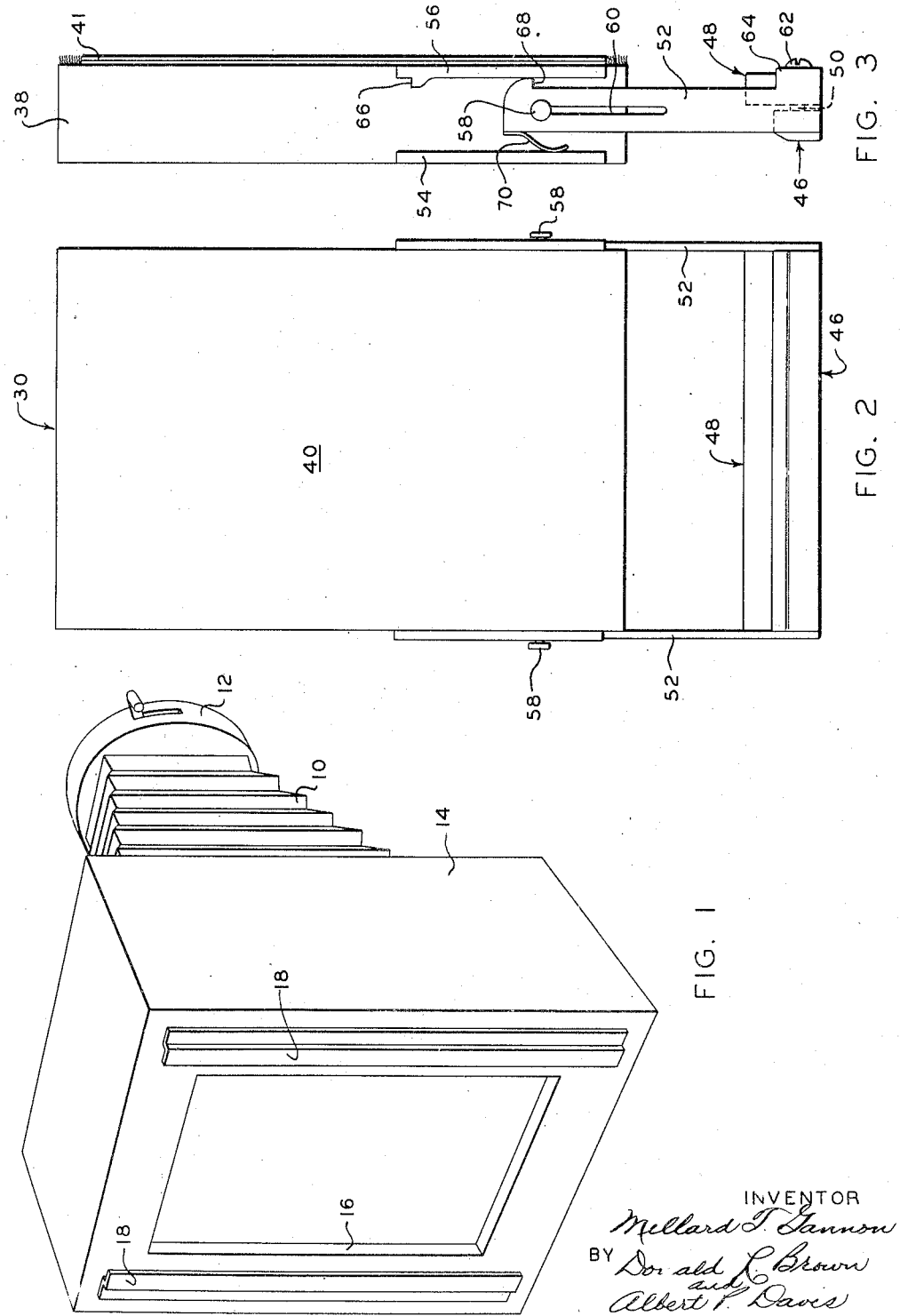
INVENTOR
Millard T. Gannon
BY Donald L. Brown
and
Albert F. Davis
Attorneys Oct. 4, 1949.　　　　　M. T. GANNON　　　　　2,483,391
DEVELOPING MAGAZINE FOR CAMERAS
Filed Jan. 10, 1948　　　　　　　　　　　2 Sheets-Sheet 2
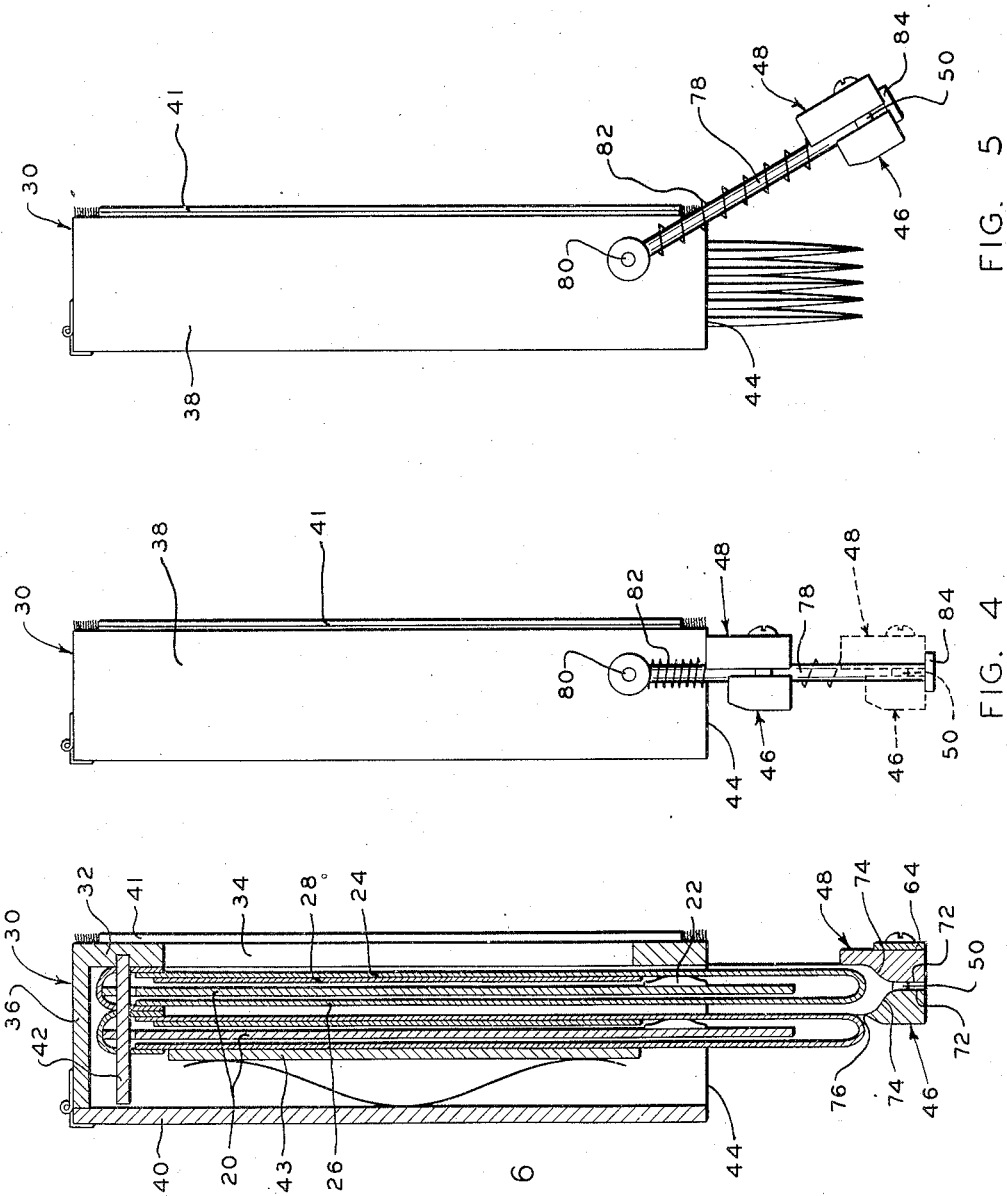

Patented Oct. 4, 1949

2,483,391

UNITED STATES PATENT OFFICE 2,483,391

DEVELOPING MAGAZINE FOR CAMERAS

Millard T. Gannon, Westwood, Mass., assignor to Polaroid Corporation, Cambridge, Mass., a corporation of Delaware Application January 10, 1948, Serial No. 1,556

11 Claims. (Cl. 95—13)

This invention relates to photographic apparatus for exposing a layer of photosensitive material to record thereon an image of an object and for processing said photographic layer wherein a liquid is spread in a layer of predetermined thickness between two sheets of flexible material, one of which is said photosensitive material.

One object of the present invention is to provide a photographic apparatus for spreading a liquid photographic reagent or solvent for a photographic reagent in a layer of predetermined uniform thickness between said exposed photosensitive material and another surface.

Another object of the present invention is to provide a photographic apparatus comprising means for holding a layer of photosensitive material in position to be exposed to actinic light and having means located exteriorly of the means for holding said photosensitive material for spreading a liquid photographic reagent or solvent for a photographic reagent in a layer of predetermined uniform thickness between said exposed photosensitive material and another surface.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a photographic camera adapted to utilize the apparatus of the present invention;

Fig. 2 is one embodiment of the present invention;

Fig. 3 is a side view of the embodiment disclosed in Fig. 2;

Fig. 4 is a side view of another embodiment;

Fig. 5 is a view of the embodiment of Fig. 4, but showing the liquid-spreading means in an inoperative position; and Fig. 6 is a diagrammatic sectional view illustrating the embodiment of Figs. 2 and 4.

The present invention comprises a photographic device for holding and exposing one or more composite photographic film units comprising a layer of photosensitive material and at least one other layer of material and processing said film units by spreading a liquid photographic reagent or solvent for a photographic reagent between said photosensitive material and another layer of material in a uniform layer of predetermined thickness.

Copending application Serial No. 576,254, filed February 5, 1945, by Edwin H. Land, for Photographic process, apparatus and product (now abandoned), discloses a method of processing a photosensitive layer by spreading a thin layer of liquid containing one or more photographic reagents, or which is a solvent for a photographic reagent, between said photosensitive layer and a second layer of material.

Copending application Serial No. 790,064, filed December 6, 1947, by Edwin H. Land, Murry N. Fairbank and David S. Grey, for Photographic process and apparatus, discloses an apparatus for carrying out the process disclosed in application Serial No. 576,254, wherein a layer of liquid spread between the photosensitive layer and the second layer of material is of a predetermined uniform thickness.

The present invention provides a photographic device capable of exposing a sheet of photosensitive material to actinic light and spreading a liquid between the surface of said photosensitive material and another layer of material in a layer of uniform predetermined thickness. The sheet of photosensitive material may comprise any photosensitive material as, for example, silver halide. The other layer of sheetlike material preferably comprises a surface adapted to receive a visible positive image of a latent negative image contained in said photosensitive material. The liquid preferably is quite viscous and comprises a reagent which preferably contains a substance, or a solvent for a substance, capable of differentially reacting with portions of said exposed photosensitive material to create a visible effect therein and preferably capable of being transferred to said other layer of sheetlike material to form a visible positive image. The apparatus is simple, reliable, easy to operate and results in a substantially uniform layer of liquid composition of predetermined desired thickness regardless of the speed with which said composition is spread and/or the viscosity of said liquid composition.

The photographic apparatus of the present invention is adapted to expose and process composite photographic film units of the type disclosed in copending application Serial No. 776,329, filed September 26, 1947, by Murry N. Fairbank, for Photographic product, and copending application Serial No. 776,326, filed September 26, 1947, by Otto E. Wolff, for Photographic product (Patent No. 2,472,358, issued June 7, 1949), and comprises a camera having a bellows 10, lens and shutter assembly 12, a back 14 having an exposure aperture 16 formed therein and carrying guide members 18 adapted to removably mount a film holder of the type disclosed in Figs. 2 and 4 on said back 14 in alignment with said aperture 16.

Figs. 2 and 3 illustrate a preferred embodiment of a film holder adapted to hold a plurality of composite photographic film units of the type disclosed in the above-mentioned copending applications, Serial Nos. 776,329 and 776,326. The composite photographic film units are explained in detail in the above-mentioned applications, Serial Nos. 776,329 and 776,326, but essentially they comprise (Fig. 6) a sheet of photosensitive material 20 as, for example, silver halide having a liquid-carrying container 22 mounted thereon and this unit enclosed in an opaque envelope having front and rear walls 24 and 26, respectively. The opaque envelope may contain a second sheet of material 28 which is adapted to receive a visible positive image of any latent negative image which may be formed in said photosensitive layer 20, or a visible positive image may be formed directly on the inner surface of the envelope wall 24. The film holder of Figs. 2 and 3 comprises a substantially rectangular container 30 having a front wall 32 having an exposure aperture 34 formed therein, a top wall 36, side walls 38 and a rear wall 40 hingedly mounted on the top wall 36. A pair of guide members 41, adapted to slidably engage guide members 18 on the back 14 to hold the container 30 on said back 14 with exposure apertures 34 and 16 in alignment, are carried by the front wall 32.

The composite photographic film units are held in the film holder by means of a pin 42 carried by front wall 32 and extending rearwardly of the container 30 and are maintained in the camera focal plane by means of a spring-pressed pressure plate 43. Container 30 is open at its lower end to provide a withdrawal opening 44 to permit the ends of the composite photographic film units to extend from said container 30 to be readily accessible for processing.

A pair of pressure-applying liquid-spreading members 46 and 48 are mounted on the side walls 38 of container 30. The pressure-applying liquid-spreading members 46 and 48 make use of certain principles and proportions disclosed in the above-mentioned copending application Serial No. 790,064, and comprise two substantially rigid members spaced apart a predetermined distance from each other by means of a pair of spacers or washers 50 to form a fixed gap or slot having substantially the same width throughout its length. The pressure-applying members 46 and 48 are slidably and to some extent pivotally mounted on side walls 38 of container 30 by means of arms 52 for sliding movement from an inoperative position to an operative position. Arms 52 are slidably mounted on side walls 38 between guide members 54 and 56 by means of pins 58 which pass through elongated slots 60 in arms 52. The pressure-applying members 46 and 48 are fixedly held with respect to each other and also mounted on the arms 52 by means of screws 62 which pass through aligned holes in pressure-applying members 46 and 48, spacers 50 and ears or tabs 64 formed on the arms 52.

A latch 66 is formed in the upper end of each of the guide members 56 and a catch 68 is formed in the upper end of each arm 52. A spring 70 attached to the upper end of each arm 52 on the side opposite of the catch 68 bears against guide members 54 and forces said catch 68 into engagement with latch 66, when the arms 52 are slid up the sides of container 30 to thus hold the liquid-spreading pressure-applying members 46 and 48 closely adjacent the open end of the container 30 in operative position. Catch 68 is released from latch 66 to permit arms 52 and pressure-applying members 46 and 48 to be moved away from the open end of container 30 to inoperative position by swinging the pressure-applying members in a counter-clockwise direction, as seen in Fig. 3, to compress the spring 70. After catch 68 is released from latch 66, arms 52 are free to slide along pins 58. The surface of each of the substantially rigid members 46 and 48 which form the fixed gap or slot comprises a substantially flat or planar portion 72 and a curved leading edge portion 74. The two leading edge portions 74 cooperate with each other to form an entrance of pressure-generating throat in the slot or gap formed by the rigid members 46 and 48. In one satisfactory form of the present invention, the leading edges 74 when viewed in cross section curve outwardly from the flat or planar portions 72 in the arc of a circle preferably having a radius of substantially $\frac{3}{16}$ inch, and flat or planar portions 72 are spaced apart a predetermined distance which is substantially .003 inch greater than the total thickness of the two opaque envelope walls 24 and 26, the photosensitive material 20 and the second sheet of material 28. When a layer of photosensitive material and a second sheet of material having a supply of liquid composition located between their interface surfaces are advanced through the slot or gap formed by the pressure-applying liquid-spreading members 46 and 48, the pressure-generating throat formed by the leading edge portions 74 causes a hydraulic pressure to be generated in said supply of liquid composition and said hydraulic pressure causes a predetermined quantity of said liquid composition to be forced through said slot or gap with each unit area of said two sheets of material as more particularly set forth in the above-mentioned application Serial No. 790,064.

In addition to the above-described configuration of pressure-applying members 46 and 48, these members are shaped and mounted on container 30 in such a manner that moving them from their inoperative position to their operative position adjacent the open end 44 of container 30 causes the end of the composite photographic film unit located adjacent the exposure aperture 34 to pass through the slot or gap formed by members 46 and 48. To permit this, pressure-applying member 46 is a predetermined distance shorter than member 48 and the length of the arms 52 is such that when the two pressure-applying liquid-spreading members 46 and 48 are in inoperative position, member 46 can pass beneath the ends of the composite photographic film units and the upper portion of member 48 will engage their ends. The upper edge 76 of member 46, at least throughout that portion of its width which is adapted to pass beneath the composite photographic film units, is wedge-shaped in cross section so that as the two pressure-applying members 46 and 48 are moved towards the container 30, said wedge-shaped edge 76 can readily enter between the film unit adjacent exposure aperture 34 and the next composite photographic film unit in the container 30 to start said adjacent film unit through the slot or gap. It is possible to cause the wedge-shaped edge 76 to automatically enter between the composite photographic film unit adjacent the exposure aperture 34 and the next succeeding photographic film unit by so proportioning pressure-applying members 46 and 48 that the distance between the inner surface of the upper edge of member 48 and the wedge-shaped edge 76 of member 46 is substantially equal to the thickness of one composite photographic film unit, or if it is desired to have a greater distance between these two elements, one or more stops may be placed on the inner surface of the upper edge of member 48 which will cause the wedge-shaped edge 76 to register with the space between the composite photographic film units.

To expose and process one of the above-described composite photographic film units in the photographic apparatus of the present invention, and more particularly the embodiment disclosed in Figs. 2 and 3, a film holder having one or more of said composite photographic film units positioned in the container 30 is fitted on the back of the camera apparatus. Catches 68 are released from latches 66 and the pressure-applying liquid-spreading members 46 and 48 are moved away from the container 30 into their inoperative position. The pressure-applying liquid-spreading members 46 and 48 are next moved back into their operative position to cause the lower end of a composite photographic film unit to pass through the slot or gap formed by the members 46 and 48 and to cause catches 68 to engage latches 66. The end of the opaque envelope which extends through the slot or gap, past the end of the photosensitive material 20, is then grasped and the opaque envelope is pulled out of the container 30 until the photosensitive material located in back of the exposure aperture 34 is uncovered. The photosensitive layer is then exposed to actinic light by operating the lens and shutter assembly 12 and the opaque envelope is pushed back into the container 30 to again cover the photosensitive material 20 and to place the second sheet of material 28 in registration with the exposed area on the photosensitive material. The entire photographic film unit is then drawn out of the container 30 through the slot or gap formed by liquid-spreading pressure-applying members 46 and 48 by grasping the composite photographic film unit high enough so that a lower end of the sheet of photosensitive material 20 is also grasped. The pressure-generating throat formed by the leading edges 74 causes a hydraulic pressure to be generated in the liquid composition carried by the liquid-carrying container 22. This hydraulic pressure causes the liquid-carrying container 22 to rupture and release said contained liquid, whereupon the pressure-generating throat upon continued movement of the composite photographic film unit through said slot or gap causes said liquid to be spread in a uniform layer of predetermined thickness between said photosensitive material 20 and the second sheet of material 28.

The modification disclosed in Figs. 4 and 5 differs from the modification of Figs. 2 and 3 in the manner in which the pressure-applying liquid-spreading members 46 and 48 are mounted on the container 30 and the manner in which the means for mounting said members 46 and 48 operate. Liquid-spreading members 46 and 48 are pivotally and slidably mounted with respect to container 30 by means of arms 78 pivotally mounted on the side walls 38 of container 30 by means of pins 80. Liquid-spreading members 46 and 48 are slidably mounted on arms 78 by means of grooves or recesses formed in the end portions of said members 46 and 48 which when said members 46 and 48 are in assembled relation, as illustrated in Figs. 4 and 5, slidably receive said arms 78. A pair of springs 82 are interposed on said arms 78 between the members 46 and 48 and pins 80, and a head or stop 84 is formed on the lower end of each of the arms 78 to prevent the liquid-spreading members 46 and 48 from coming off said arms 78. It will thus be seen that in this modification pressure-applying liquid-spreading members 46 and 48 are capable of sliding towards and away from the open end 44 of container 30 on arms 78 and also are capable of being pivoted away from said open end 44 around the pins 80.

When it is desired to expose and process one of the above-described composite photographic film units in the modification of Figs. 4 and 5, the pressure-applying liquid-spreading members 46 and 48 are slid upward on the arms 78 to cause the lower end of said composite photographic film unit to extend through the slot or gap formed by said members 46 and 48. The lower end of the opaque envelope is then grasped and the opaque envelope is pulled out of the container 30 until the photosensitive material located in back of the exposure aperture 34 is uncovered. As the opaque envelope is drawn from the container 30, the pressure-applying liquid-spreading members 46 and 48 move back down the arms 78 under the influence of springs 82. After the photosensitive material has been exposed, the opaque envelope is pushed back into the container 30 to again cover the photosensitive material 20. The act of pushing the opaque envelope into the container 30 causes the fingers of the operator to engage the lower edges of the pressure-applying liquid-spreading members 46 and 48 and again slide them upwardly on the arms 78. The entire photographic film unit is then drawn out of the container 30 by grasping the composite photographic film unit high enough so that the lower end of the sheet of photosensitive material 20 is also grasped. As the composite photographic film unit is drawn out of the container 30 the pressure-applying liquid-spreading members 46 and 48 are again permitted to slide down the arms 78 under the influence of springs 82 until they strike the stop 84. Continued withdrawal of the composite photographic film unit, after the pressure-applying liquid-spreading members 46 and 48 strike the stops 84, causes the above-mentioned hydraulic pressure to be generated in the liquid composition to rupture container 22 and spread the liquid between the photosensitive layer 20 and the second layer of material 28, as above described.

Whereas the pressure-applying liquid-spreading members 46 and 48 have been disclosed as fixedly mounted with respect to each other, it will be understood that they can be adjustably mounted with respect to each other by means of an adjustment screw or screws or they can be held a predetermined minimum distance apart by means of spring loading of sufficient strength to resist the hydraulic pressure generated in the liquid composition but which will permit incompressible objects to pass between the members 46 and 48.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic device comprising a means adapted to hold a plurality of multilayer photographic film units for successive exposure and processing, said film units comprising at least two layers of material one of which is a photosensitive layer, said device being so constructed that a predetermined image area on said photosensitive layer of each of said photographic film units can be exposed to actinic light and the exposed photosensitive layer and another of said layers of material can be drawn therefrom in face-to-face relation, and two substantially parallel rigid members spaced from each other a predetermined distance and slidably and pivotally mounted on said device exteriorly thereof, said parallel members being so positioned with respect to said device that they can be moved to a position wherein said exposed photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

2. A photographic device comprising a means adapted to hold a plurality of multilayer photographic film units for successive exposure and processing, said film units each comprising at least two layers of material one of which is a photosensitive layer, said device being so constructed that a predetermined image area on said photosensitive layer of each of said photographic film units can be exposed to actinic light and the exposed photosensitive layer and another of said layers of material can be drawn therefrom in face-to-face relation, and two substantially parallel rigid members spaced from each other a predetermined distance and slidably and pivotally mounted on said device exteriorly thereof, one of said rigid members being wedge-shaped in cross section along its upper edge, said parallel members being so positioned with respect to said device that they can be moved to a position wherein said one member having said wedge-shaped upper edge passes between the ends of two of said film units to start the film unit next to be exposed and processed between said rigid members so that said exposed photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

3. A photographic device comprising means providing an exposure chamber wherein a plurality of film units each comprising a photosensitive layer may be sequentially exposed, means forming an aperture in said chamber means through which said film units may be withdrawn from said chamber means, a pair of pressure-applying members, and means for slidably and pivotally attaching said pair of pressure-applying members to said chamber means exteriorly thereof so that said pressure-applying members may assume at least two different positions with respect to said chamber means, in one position thereof said members being located opposite said aperture and closely adjacent thereto in the path of withdrawal of said film units from said chamber means whereby each unit may be withdrawn between said members to cause the spreading of a processing fluid releasably carried thereby throughout a predetermined portion thereof and, in the other position thereof, said members being located away from said aperture to enable at least one of said pressure-applying members to pass beneath at least one of said film units.

4. A photographic device comprising means providing an exposure chamber wherein a plurality of film units each comprising a photosensitive layer may be successively exposed, means forming an aperture in said chamber means through which said film units may be withdrawn from said chamber means, a pair of pressure-applying members, the upper edge of one of said members being wedge-shaped in cross section, and means for slidably and pivotally attaching said pair of pressure-applying members to said chamber means exteriorly thereof so that said pressure-applying members may assume at least two different positions with respect to said chamber means, in one position thereof said members being located opposite said aperture in the path of withdrawal of one of said film units from said chamber means and having said member having said wedge-shaped upper edge inserted between the ends of two of said film units whereby one of said units may be withdrawn between said members to cause the spreading of a processing fluid releasably carried thereby throughout a predetermined portion thereof and, in the other position thereof, said members being located away from said aperture to enable said member having said wedge-shaped upper edge to pass beneath the ends of said film units.

5. A photographic device comprising a means adapted to hold a plurality of multilayer photographic film units for successive exposure and processing, said film units each comprising at least two layers of material one of which is a photosensitive layer, said device being so constructed that a predetermined image area on said photosensitive layer of each of said photographic film units can be exposed to actinic light and the exposed photosensitive layer and another of said layers of material can be drawn therefrom in face-to-face relation, and two substantially parallel rigid members spaced from each other a predetermined distance and slidably and pivotally mounted on said device exteriorly thereof by means of a pair of arms pivotally carried by said device, one of said rigid members being wedge-shaped in cross section along its upper edge, said arms being of such a length that said parallel members can be moved from a position wherein said one member having said wedge-shaped upper edge can pass beneath the ends of said film units to a position wherein it is located between the ends of two of said film units to start the film unit next to be exposed and processed between said rigid members so that said exposed photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

6. A photographic device comprising a means adapted to hold a plurality of multilayer photographic film units for successive exposure and processing, said film units each comprising at least two layers of material one of which is a photosensitive layer, said device being so constructed that a predetermined image area on said photosensitive layer of each of said photographic film units can be exposed to actinic light and the exposed photosensitive layer and another layer of said layers of material can be drawn therefrom in face-to-face relation, and two substantially parallel rigid members spaced from each other a predetermined distance and slidably and pivotally mounted on said device exteriorly thereof by means of a pair of arms pivotally and slidably carried by said device, one of said rigid members being wedge-shaped in cross section along its upper edge, said arms being of such a length and being so capable of sliding a predetermined distance that said parallel members can be moved from a position wherein said one member having said wedge-shaped upper edge can pass beneath the ends of said film units to a position wherein it is located between the ends of two of said film units to start the film unit next to be exposed and processed between said rigid members so that said exposed photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

7. A photographic device comprising a means adapted to hold a plurality of multilayer photographic film units for successive exposure and processing, said film units each comprising at least two layers of material one of which is a photosensitive layer, said device being so constructed that a predetermined image area on said photosensitive layer of each of said photographic film units can be exposed to actinic light and the exposed photosensitive layer and another layer of said layers of material can be drawn therefrom in face-to-face relation, and two substantially parallel rigid members spaced from each other a predetermined distance and slidably and pivotally mounted on said device exteriorly thereof by means of a pair of arms pivotally and slidably carried by said device, one of said rigid members being wedge-shaped in cross section along its upper edge, said arms being of such a length and being so capable of sliding a predetermined desired distance that said parallel members can be moved from a position wherein said one member having said wedge-shaped upper edge can pass beneath the ends of said film units to a position wherein it is located between the ends of two of said film units to start the film unit next to be exposed and processed between said rigid members, said arms each being provided with a catch capable of engaging a portion of said device to releasably hold said parallel members in said last-mentioned position so that said exposed photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

8. A photographic device comprising a means adapted to hold a plurality of multilayer photographic film units for successive exposure and processing, said film units each comprising at least two layers of material one of which is a photosensitive layer, said device being so constructed that a predetermined image area on said photosensitive layer of each of said photographic film units can be exposed to actinic light and the exposed photosensitive layer and another of said layers of material can be drawn therefrom in face-to-face relation, and two substantially parallel rigid members spaced from each other a predetermined distance and slidably carried by a pair of arms pivotally mounted on said device exteriorly thereof, one of said rigid members being wedge-shaped in cross section along its upper edge, said arms being of such a length that said parallel members can be moved from a position wherein said one member having said wedge-shaped upper edge can pass beneath the ends of said film units to a position wherein it is located between the ends of two of said film units to start the film unit next to be exposed and processed between said rigid members so that said exposed photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

9. A photographic device comprising a means adapted to hold a plurality of multilayer photographic film units for successive exposure and processing, said film units each comprising at least two layers of material one of which is a photosensitive layer, said device being so constructed that a predetermined image area on said photosensitive layer of each of said photographic film units can be exposed to actinic light and the exposed photosensitive layer and another of said layers of material can be drawn therefrom in face-to-face relation, and two substantially parallel rigid members spaced from each other a predetermined distance and slidably carried by a pair of arms pivotally mounted on said device exteriorly thereof, one of said rigid members being wedge-shaped in cross section along its upper edge, said arms being of such a length that said members can be slid therealong from a position where said one member having said wedge-shaped upper edge can pass beneath the ends of said film units to a position wherein it is located between the ends of two of said film units to start the film unit next to be exposed and processed between said rigid members so that said exposed photosensitive layer and said other layer of material can be drawn therebetween in face-to-face relation, the second of said rigid members being provided with stop means capable of directing said wedge-shaped upper edge between the ends of the film unit next to be exposed and processed and the next succeeding film unit, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

10. A photographic apparatus comprising means for releasably positioning a layer of photosensitive material and another layer of material in said photographic apparatus, said means being so constructed that a predetermined area on said photosensitive layer can be exposed to actinic light and said photosensitive layer and said other layer can be drawn therefrom in face-to-face relation, and two substantially parallel rigid members spaced from each other a predetermined distance and slidably and pivotally mounted on said apparatus exteriorly thereof, said parallel members being so mounted that they can be moved to a position wherein said photosensitive layer and said other layer of material can be drawn therebetween in face-to-face relation, a portion of the space between said parallel members comprising a pressure-generating throat whereby a hydraulic pressure can be generated in a liquid between said layers of material to cause said liquid to form a layer of substantially uniform predetermined thickness.

11. A photographic device comprising a means adapted to hold a plurality of multilayer photographic film units for successive exposure and processing, said film units each comprising at least two layers of material, one of which is a photosensitive layer, said device being so constructed that a predetermined image area on said photosensitive layer of each of said photographic film units can be exposed to actinic light and the exposed photosensitive layer and another of said layers of material can be drawn therefrom in face-to-face relation, and two substantially parallel rigid members spaced from each other a predetermined distance and slidably and pivotally mounted on said device exteriorly thereof, one of said rigid members being so shaped and positioned with respect to said device that it can move to a position wherein the edge thereof passes between the ends of said film units to start the film unit next to be exposed and processed between said rigid members so that the photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to form a liquid layer of substantially uniform predetermined thickness.

MILLARD T. GANNON.

REFERENCES CITED

The following references are of record in the file of this patent:

UNITED STATES PATENTS

| Number | Name | Date |
| --- | --- | --- |
| 1,277,462 | Newman | Sept. 3, 1918 |
| 1,794,382 | Josepho | Mar. 3, 1931 |